United States Patent [19]

Trachtenberg

[11] Patent Number: 6,089,032
[45] Date of Patent: Jul. 18, 2000

[54] METHOD OF RETROFITTING AIR CONDITIONER AND SYSTEM THEREFOR

[75] Inventor: Saul Trachtenberg, Brooklyn, N.Y.

[73] Assignee: Interdynamics Inc., Brooklyn, N.Y.

[21] Appl. No.: 09/181,682

[22] Filed: Oct. 28, 1998

[51] Int. Cl.[7] .................................................. F25B 45/00
[52] U.S. Cl. .................................. 62/149; 62/77; 62/174
[58] Field of Search .............................. 62/149, 174, 125, 62/292, 77

[56] References Cited

U.S. PATENT DOCUMENTS

| | | | |
|---|---|---|---|
| 3,252,475 | 5/1966 | Jones | 137/318 |
| 4,535,802 | 8/1985 | Robertson | 137/322 |
| 4,644,982 | 2/1987 | Hatch | 141/383 |
| 4,895,190 | 1/1990 | Gillen | 141/1 |
| 4,958,501 | 9/1990 | Nakano et al. | 62/125 |
| 5,750,046 | 5/1998 | Wheeler | 252/68 |
| 5,826,636 | 10/1998 | Trigiani | 141/382 |

*Primary Examiner*—Henry Bennett
*Assistant Examiner*—Melvin Jones
*Attorney, Agent, or Firm*—Levisohn, Lerner, Berger & Langsam

[57] ABSTRACT

A kit and method for retrofitting an R-12 air conditioner into an R-134a air conditioner are provided. The kit includes a first pressurized container of R-134a lubricant or oil sufficient to fully charge an automobile air conditioner. Preferably, the first container also contains pressurized refrigerant 134a to act as a propellant to deliver the lubricant in aerosol form. A second pressurized container may also be provided containing a full charge of R-134a for an auto air conditioner. The kit includes a service port adapter, configured to be convertible to the service port of an automobile air conditioner wherein both the first and second containers may be hooked up to the auto air conditioner via the same service port adapter.

15 Claims, 1 Drawing Sheet

METHOD OF RETROFITTING AIR CONDITIONER AND SYSTEM THEREFOR

BACKGROUND

1. Field of the Invention

The invention relates to automobile air conditioners and more specifically to a method and system for retrofitting automobile air conditioners to make them less environmentally dangerous.

2. Description of the Related Art

Up until recently, automobile air conditioners were provided with Refrigerant-12, or R-12, as their primary refrigerant. Lubrication for the air conditioner was provided by what may be termed R-12 lubricant. It has been discovered that R-12 is a environmentally dangerous material, because when it is released into the atmosphere, R-12 has deleterious effects on the Earth's ozone layer. A substitute refrigerant, R-134a, has been developed and is being used in modern automobile air conditioners. R-134a requires its own lubricant.

Older automobiles must be retrofit from using R-12 to using R-134a. Previously, retrofitting involved opening the air conditioning system, an otherwise closed system, prior to adding R-134a and its associated lubricant. A mechanical oil injector has typically been employed. This increases the chances of dangerous and toxic chemicals (i.e., R-12 and its lubricant, and R-134a and its lubricant) from spilling and/or leaking into the ambient air.

Conventionally, it has been known to add small amounts of R-134a lubricant to an air conditioner. Typically, aerosol of oil charges are provided which add no more than 2 ounces of R-134a lubricant into an air conditioner. However, the typical automobile air conditioner requires up to 8 ounces of lubricant to be fully charged and functional. Such a 2 ounce charge is only suitable for "topping off" an air conditioner with a reduced level of R-134a or oil, and is not suitable for a complete retrofit of an R-12 system. Moreover, once the lubricant is added, R-134a must also be added in a separate step or steps. Typically, a separate attachment is required to connect the container of R-134a to the air conditioning system. This method is inconvenient and slow.

There is a long-felt need to provide a method and kit for retrofitting an R-12 air conditioner for R-134a in fewer steps than is currently available.

SUMMARY OF THE INVENTION

It is an object of the invention to provide a method and kit for retrofitting an R-12 air conditioner for R-134a in than is conventionally available.

It is another object of the invention to provide an R-12 to R-134a retrofit kit that can retrofit an air conditioner with a single charging device.

It is another object of the invention to provide an R-12 to R-134a retrofit kit that is simple to use.

It is another object of the invention to provide an air conditioner retrofit kit that is safe for the environment.

The above and other objects are accomplished by the invention which includes a kit for retrofitting an R-12 air conditioner into an R-134a air conditioner. In one embodiment, the kit includes a first pressurized container of R-134a lubricant or oil sufficient to fully charge an automobile air conditioner. Preferably, the first container delivers 8 ozs. of R-134a lubricant. Preferably, the first container also contains pressurized refrigerant 134a to act as a propellant to deliver the oil in aerosol form. A second pressurized container may also be provided containing a full charge of R-134a for an auto air conditioner. Preferably, the inventive kit includes a service port adapter, configured to be convertible to the service port of an automobile air conditioner wherein both the first and second containers may be hooked up to the auto air conditioner via the same service port adapter.

The inventive kit has several advantages over conventional systems. First, by providing a full charge of oil in an aerosol form in one container, a user may retrofit an R-12 system into an R-134a system more easily than by using a mechanical oil injector. Second, by using R-134a itself as the aerosol propellant for the oil, the invention adds some refrigerant to the air conditioner while the air conditioner is being retrofitted to use R-134a, thereby saving time and refrigerant. Third, by providing a service port adapter that can accommodate both the first container of oil and the second container of R-134a, retrofitting is accomplished in simpler steps using fewer parts, i.e., separate connectors for the oil and R-134a containers are obviated. Retrofitting is thus made less expensive owing to the need for fewer parts and is made more convenient.

The invention also includes a method for retrofitting an automobile air conditioner. A service port adapter is attached to the service port of the air conditioner. A first container of lubricant in aerosol form propelled by R-134a is connected to the service port adapter via a connector hose. A valve provided on the connector hose is opened, and a full charge of oil is propelled into the air conditioner along with a quantity of R-134a. There are provided the steps of connecting a second container filled with R-134a to the same connector hose, opening the valve, and filling the air conditioner with the R-134a.

DETAILED DESCRIPTION OF PREFERRED EMBODIMENTS

Figure 1:
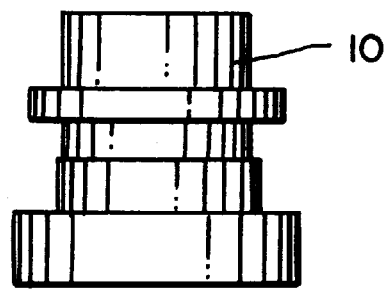
FIG. 1 is a front view diagram of the service port adapter of the invention.
Figure 2:
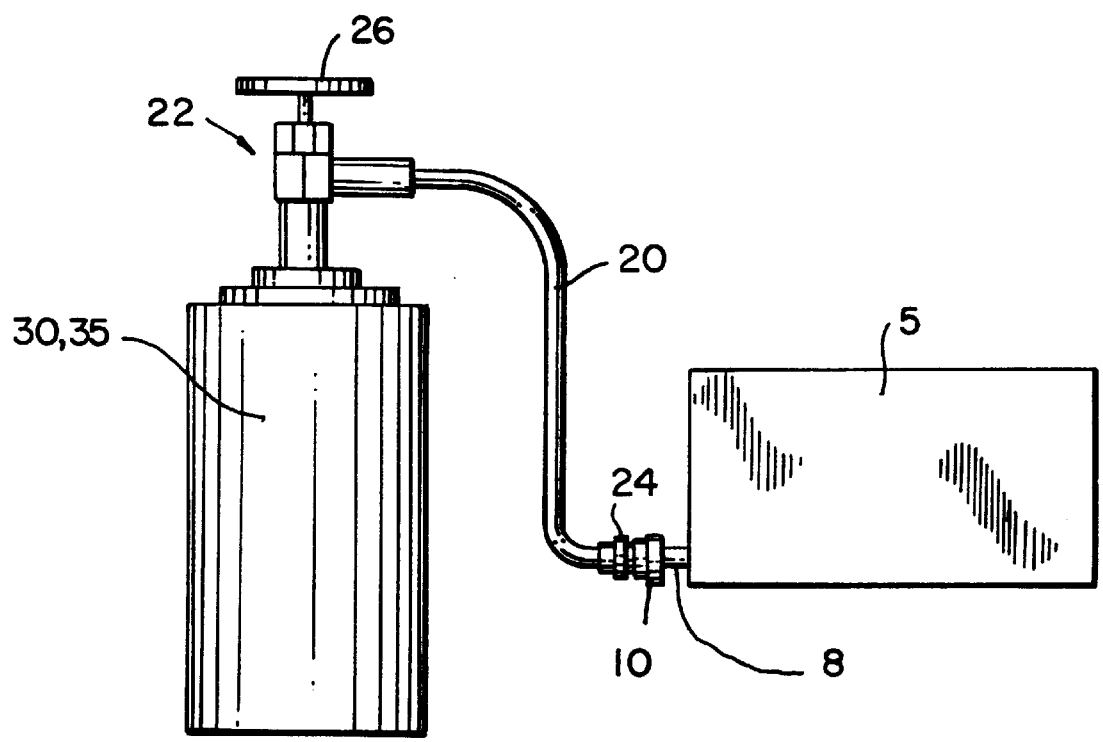
FIG. 2 is a front view diagram of a kit according to the invention in use for retrofitting an air conditioner.

Description herein follows with reference to FIGS. 1–2. Numeral 5 represents the automobile air conditioner (in block form) that requires retrofitting from R-12 to R-134a. Air conditioner 5 possesses service port 8 for receiving refrigerant and lubricant.

Service port adapter 10 is attached to air conditioner 5 via service port 8. This enables connecting hose 20 to communicate with air conditioner 5. Hose 20 includes, at one end, puncture valve 22 and connector 24 at the other end. Puncture valve 22 attaches to cans 30, 35 of refrigerant and/or lubricant, one can at a time. Connector 24 attaches hose 20 to service port adapter 10. When one of cans 30, 35 is secured to valve 22 (after connector 24 is attached to adapter 10), handle 26 is turned. The turning of handle 26 forces a pin (not shown) to puncture the seal (not shown) of the can, and the pressurized contents of the can are forced through valve 24, along hose 20, through adapter 10, and into air conditioner 5.

In operation, the invention is used as follows. First, refrigerant 12 is removed from the system in an environmentally safe fashion known in the art. Service port adapter 10 is securely attached to port 8 of air conditioner 5.

Connector 24 of hose 20 is then secured to adapter 10. Can 30, containing lubricant propelled by R-134a, is attached to valve 22. Handle 26 is turned, the seal of can 30 is broken, and the lubricant therein is forced under pressure into the air conditioner 5. Valve 22 is closed, and can 30 is removed. Can 35, containing a full charge of R-134a, is attached to valve 22. Handle 26 is again turned, puncturing the seal of can 35, thereby allowing the pressurized R-134a to move from can 35 into air conditioner 5.

Having described the invention with regard to specific embodiments, it is to be understood that the description is not meant as a limitation excluding such further variations or modifications as may be apparent or may suggest themselves to those skilled in the art it is intended that the present invention cover such variations and modifications as fall within the scope of the appended claims.

I claim:

1. A kit for retrofitting an automobile air conditioner from using refrigerant R-12 to refrigerant R-134 a, comprising:

a first pressurized container containing R-134a lubricant and refrigerant R-134a under pressure, said refrigerant R-134a acting as a propellant for said R-134a lubricant, said first pressurized container containing sufficient R-134a lubricant to charge substantially completely and thus retrofit substantially fully an automobile air conditioner; and means for conveying said lubricant and said second refrigerant from said first pressurized container to the air conditioner simultaneously.

2. A retrofitting kit according to claim 1, further comprising a second pressurized container containing an additional amount of said refrigerant R-134a .

3. A retrofitting kit according to claim 2, wherein said second pressurized container contains an amount of said refrigerant R-134a to charge substantially completely and thus to fully retrofit the automobile air conditioner.

4. A retrofitting kit according to claim 2, wherein said conveying means is selectively attachable to both said first and second pressurized containers.

5. A retrofitting kit according to claim 4, wherein said first pressurized container comprises a first seal and said second pressurized container comprises a second seal.

6. A retrofitting kit according to claim 5, wherein said first and second seals comprise puncture seals.

7. A retrofitting kit according to claim 5, wherein said conveying means comprises:

a valve selectively sealingly attachable to both said first and second seals;

a hose, in communication with said valve at a first end of said hose; and an adapter, in communication with a second end of said hose, sealingly connectable to a service port of the air conditioner to be retrofitted.

8. A retrofitting kit according to claim 7, wherein said refrigerant 134a in said first pressurized container acts as a propellent for said R-134a lubricant when said valve is attached to said first seal.

9. A retrofitting kit according to claim 7, wherein said first and second seals comprise puncture seals and said valve comprises a puncture valve.

10. A method of completely retrofitting an automobile air conditioner from using refrigerant R-12 to refrigerant R-134a, comprising the steps of:

a) sealingly attaching an adapter to a service port of the air conditioner;

b) providing a first pressurized container containing R-134a lubricant and refrigerant R-134a;

c) sealingly attaching the first pressurized container to the adapter via a connector hose; and d) opening a valve on the connector hose, wherein said opening step d) causes the R-134a lubricant and refrigerant R-134a to be propelled into the air conditioner, the refrigerant R-134a acting as propellent for the lubricant, wherein the first pressurized container contains an amount of the lubricant sufficient to substantially fully retrofit the air conditioner.

11. A retrofitting method according to claim 10, wherein during and after said opening step d), the R-134a lubricant is conveyed to the automobile air conditioner in aerosol form.

12. A retrofitting method according to claim 10, further comprising the steps of:

e) providing a second pressurized container containing an additional amount of refrigerant R-134a;

f) sealingly attaching the second pressurized container to the adapter via the connector hose; and g) opening the valve on the connector hose, wherein said opening step g) causes the additional amount of refrigerant R-134a to be propelled into the air conditioner.

13. A retrofitting method according to claim 12, wherein the second pressurized container contains an amount of refrigerant R-134a to substantially fully retrofit the air conditioner.

14. A retrofitting method according to claim 12, wherein the connector hose is sealingly connected to the first pressurized container at the valve in said attaching step c) and the connector hose is sealingly connected to second pressurized container at the valve in said attaching step f).

15. A retrofitting method according to claim 10, wherein the connector hose is sealingly connected to the first pressurized container at the valve in said attaching step c).

* * * * *